(12) United States Patent
Arimatsu

(10) Patent No.: US 9,263,929 B2
(45) Date of Patent: Feb. 16, 2016

(54) SQUIRREL-CAGE ROTOR AND ELECTRIC MOTOR HAVING SQUIRREL-CAGE ROTOR

(71) Applicant: FANUC CORPORATION, Yamanashi (JP)

(72) Inventor: Yohei Arimatsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 43 days.

(21) Appl. No.: 14/225,554

(22) Filed: Mar. 26, 2014

(65) Prior Publication Data

US 2014/0292135 A1    Oct. 2, 2014

(30) Foreign Application Priority Data

Mar. 27, 2013    (JP) .................................. 2013-066277
Mar. 5, 2014    (JP) .................................. 2014-042816

(51) Int. Cl.
     *H02K 17/16*      (2006.01)

(52) U.S. Cl.
     CPC .................................... *H02K 17/165* (2013.01)

(58) Field of Classification Search
     CPC ..... H02K 17/16; H02K 17/165; H02K 17/20; H02K 17/205
     USPC ........................................................ 310/211
     See application file for complete search history.

(56) References Cited

U.S. PATENT DOCUMENTS

| 5,548,172 | A | * | 8/1996 | Kliman et al. | ........... 310/156.53 |
| 5,572,080 | A | * | 11/1996 | Nakamura et al. | ............. 310/211 |
| 6,058,596 | A | | 5/2000 | Jansen et al. | |
| 8,319,388 | B2 | * | 11/2012 | Yoshino et al. | ................ 310/212 |
| 2007/0247015 | A1 | * | 10/2007 | Dellinger | ........................ 310/217 |
| 2011/0175484 | A1 | * | 7/2011 | Wang et al. | .................... 310/211 |
| 2012/0159983 | A1 | * | 6/2012 | Tsutsumi et al. | ................ 62/498 |
| 2013/0069476 | A1 | | 3/2013 | Lyons et al. | |

FOREIGN PATENT DOCUMENTS

| DE | 102008010909 A1 | 9/2008 |
| JP | 04069034 A | 3/1992 |
| JP | 06253511 A | 9/1994 |
| WO | 2008104347 A1 | 9/2008 |
| WO | 2011033467 A2 | 3/2011 |

* cited by examiner

*Primary Examiner* — Burton Mullins
(74) *Attorney, Agent, or Firm* — Fredrikson & Byron P.A.

(57) ABSTRACT

A squirrel-cage rotor includes a laminated core provided on an outer circumference of a rotational axis, and a plurality of slots formed in the laminated core in a circumferential direction, so as to be spaced apart from each other. The cross-section shape of each slot includes an inner circumferential edge and an outer circumferential edge extending in the circumferential direction so as to face each other, and a first side portion and a second side portion extending in a radial direction so as to face each other. The radius of curvature of the inner circumferential edge is larger than that of corners on an inner circumferential side of the slot. The radius of curvature of the outer circumferential edge is larger than that of corners on an outer circumferential side of the slot.

8 Claims, 8 Drawing Sheets

SQUIRREL-CAGE ROTOR AND ELECTRIC MOTOR HAVING SQUIRREL-CAGE ROTOR

BACKGROUND OF THE INVENTION

1. Field of the Invention

The present invention relates to a squirrel-cage rotor and an electric motor having the squirrel-cage rotor.

2. Description of the Related Art

FIG. 6 is a sectional view showing a laminated core 100 of a rotor according to the related art. The laminated core 100 is provided with a plurality of slots 102 spaced apart from each other in a circumferential direction C (rotational direction), and includes teeth 104 forming a magnetic flux path through the laminated core 100, and the teeth 104 and slots 102 are arranged alternately in the circumferential direction C. The illustrated slots 102 formed in the laminated core 100 are closed slots, whose outer circumferential edges are closed by the outer circumference 100a of the laminated core 100. The slots 102 of this type are entirely surrounded by the laminated core 100.

FIG. 7 is a partially enlarged view illustrating one slot 102 of the laminated core 100 shown in FIG. 6 and its periphery. When an electric motor with a rotor which includes the laminated core 100 is rotated at high speed, stress concentration occurs in areas close to a slot bottom portion 102a and a slot top portion 102b. In the case where an inner circumferential edge 106 and an outer circumferential edge 108 of the slot 102 are defined by a simple arc shape, the thickness of the laminated core 100 in a radial direction R is sharply reduced at the slot bottom portion 102a and the slot top portion 102b. This results in considerable stress concentration. In FIG. 7, broken lines show areas Q1 and Q2 where stress concentration occurs.

Japanese Patent JP-A-6-253511 discloses a rotor provided with elongated slots extending in the circumferential direction, in order to reduce the maximum stress generated in the circumferential edges of the slots. FIG. 8 is a partially enlarged view illustrating two adjoining slots 202 and their peripheries of a laminated core 200 disclosed in JP-A-6-253511. As shown in the drawing, the slots 202 according to this related art have a characteristic sectional shape whose size defined in the circumferential direction C is larger than that defined in the radial direction R.

However, if the slots 202 have an elongated shape in this manner, bridge portions 206 defined between the slots 202 and the outer circumference 204 of the laminated core 200 also have an elongated shape in the circumferential direction C. This increases the centrifugal force acting on the bridge portion 206. The bridge portion 206 receives centrifugal force acting on a conductor (not shown) accommodated in the slot 202. The centrifugal force acting on the conductor is also increased when the slot 202 has an elongated shape in the circumferential direction. As a result, a tensile force, which pulls the bridge portion 206 toward the outside in the radial direction R, is increased. This results in increased stress generated in areas Q5 and Q6 at positions near the respective end portions of the slot 202. In addition, stress concentration tends to occur in the areas Q5 and Q6 where the curvature of the slot 202 is sharply changed. Therefore, unless the areas Q5 and Q6 have sufficient strength, the bridge portion 206 may possibly fracture at the areas Q5 and Q6 and break off from the laminated core 200. On the inner side of the slot 202 in the radial direction R, stress concentration similarly occurs at areas Q3 and Q4 where the curvature of the slot 202 is sharply changed. In addition, since the areas Q3 and Q4 receives centrifugal force acting on a tooth 212 extending between the slots 202, increased stress occurs at the areas Q3 and Q4. Therefore, unless the areas Q3 and Q4 have sufficient strength, this may cause the laminated core 200 to fracture. In the rotor according to this related art, the rotational speed of the electric motor is limited, depending on the strength of the areas Q3 to Q6 where stress concentration occurs.

Further, according to this related art, side portions 208 and 210 of the slot 202 extending along the radial direction R have a protruding shape which protrudes toward an opposite side portion 210 of another slot 202 arranged next thereto in the circumferential direction C. As a result, a tooth 212 formed between the adjoining slots 202 has a narrower portion 214 whose width becomes locally small. Since the narrower portion 214 limits the amount of magnetic flux passing through the laminated core 200, the amount of torque generated by the electric motor is reduced.

Accordingly, there is a need for a rotor which reduces stress concentration in a laminated core, allowing for increased rotational speed, and for an electric motor having such a rotor.

SUMMARY OF THE INVENTION

According to a first aspect of the present invention, a squirrel-cage rotor comprising: a rotational axis extending in an axial direction; a laminated core provided on an outer circumference of the rotational axis; and a plurality of slots arranged in the laminated core so as to be spaced apart from each other in a circumferential direction, and extending in the axial direction, wherein each slot is a closed slot whose entire circumference is closed by the laminated core, and has a sectional shape in a direction perpendicular to the axial direction, wherein the sectional shape of each slot includes: an inner circumferential edge and an outer circumferential edge, each of which extends in the circumferential direction of the laminated core; a first side portion and a second side portion, each of which extends in a radial direction of the laminated core; a first curved corner connecting the inner circumferential edge to the first side portion; a second curved corner connecting the inner circumferential edge to the second side portion; a third curved corner connecting the outer circumferential edge to the first side portion; and a fourth curved corner connecting the outer circumferential edge to the second side portion, wherein the inner circumferential edge has a radius of curvature greater than that of the first curved corner and the second curved corner, the inner circumferential edge protruding inwardly in the radial direction, and wherein the outer circumferential edge has a radius of curvature greater than that of the third curved corner and the fourth curved corner, the outer circumferential edge protruding outwardly in the radial direction, is provided.

According to a second aspect of the present invention, in the squirrel-cage rotor according to the first aspect, the first side portion and the second side portion are respectively defined by straight lines, and the first side portion and the second side portion are formed so as to respectively extend parallel to the second side portion and the first side portion of other slots adjoining thereto in the circumferential direction.

According to a third aspect of the present invention, in the squirrel-cage rotor according to the first or second aspect, the laminated core has an inner thickness defined between the inner circumferential edge and an inner circumference of the laminated core, the inner thickness being sized from one of the first curved corner and the second curved corner toward the other of the first curved corner and the second curved corner, such that the inner thickness is gradually decreased until it reaches a minimum value at a slot bottom portion, and is gradually increased after reaching the minimum value.

According to a fourth aspect of the present invention, in the squirrel-cage rotor according to the third aspect, the slot bottom portion is positioned in the middle of the slot in the circumferential direction.

According to a fifth aspect of the present invention, in the squirrel-cage rotor according to any of the first to fourth aspects, the laminated core has outer thickness defined between the outer circumferential edge and an outer circumference of the laminated core, the outer thickness being sized from one of the third curved corner and the fourth curved corner to the other of the third curved corner and the fourth curved corner, such that the outer thickness is gradually decreased until it reaches a minimum value at a slot top portion, and is gradually increased after reaching the minimum value.

According to a sixth aspect of the present invention, in the squirrel-cage rotor according to the fifth aspect, the slot top portion is positioned in the middle of the slot in the circumferential direction.

According to a seventh aspect of the present invention, in the squirrel-cage rotor according to the fifth or sixth aspect, the outer circumferential edge has a curved portion passing through the slot top portion, the curved portion having a radius of curvature sized to be smaller than a radius of a circle which is concentric with the laminated core and passes through the slot top portion, and larger than a radius of an inscribed circle which passes through the slot top portion and is inscribed in the first side portion and the second side portion.

According to an eighth aspect of the present invention, an electric motor having the squirrel-cage rotor according to any of the first to seventh aspects, is provided.

These and other objects, features and advantages of the present invention will become more apparent in light of the detailed description of exemplary embodiments thereof as illustrated by the drawings.

DETAILED DESCRIPTION OF THE INVENTION

Referring to the accompanying drawings, embodiments of the present invention will be explained below. Constituent elements of the illustrated embodiments may be modified in size in relation to one another for better understanding of the present invention. The same or corresponding elements are designated with the same referential numeral.

Figure 1:
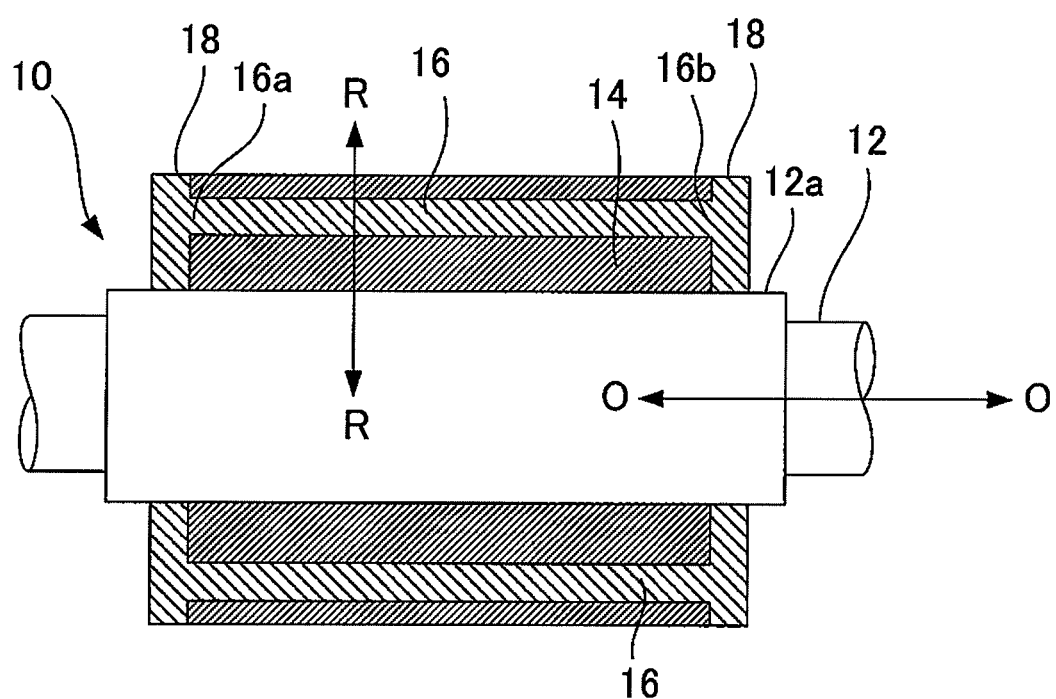
FIG. 1 is a sectional view schematically illustrating a rotor according to an embodiment of the present invention.

FIG. 1 is a sectional view illustrating a rotor 10 according to an embodiment of the present invention. The rotor 10 is a squirrel-cage rotor, including a rotational axis 12 extending in an axial direction O of the rotor 10, a laminated core 14 provided on an outer circumference 12a of the rotational axis 12, a plurality of conductive bars 16 extending in the laminated core 14 in a direction substantially parallel to the axial direction O, and annular conductive rings 18 provided at both end portions 16a and 16b of the conductive bar 16 in the axial direction O, so as to electrically connect the conductive bars 16 with one another. The rotor 10 is designed to be rotated in cooperation with a stator (not shown) provided outside in the radial direction R of the rotor 10. The rotor 10 and the stator together form an induction motor.

The laminated core 14 is a substantially cylindrical member formed from a number of electromagnetic steel plates stacked on top of another in the axial direction O. The conductive bar 16 and the conductive ring 18 are made, for example, of aluminum or aluminum alloy. Alternatively, the conductive bar 16 and the conductive ring 18 may be made of copper or copper alloy whose electric resistance is lower than that of aluminum or aluminum alloy. The rotor 10 may be skewed, in which case, the conductive bar 16 extends so as to be at an angle relative to the axial direction O.

In general, stress generated in the rotor is increased as the rotational speed of the rotor increases. In other words, for the purpose of operating an electric motor at higher speed by increasing the maximum rotational speed of the rotor, one approach is to reduce the maximum stress taking place in the rotor. According to the present embodiment, the shape of the slot formed in the laminated core 14 is optimized so as to reduce the maximum stress generated in the rotor 10. Specifically, the present embodiment is based on the idea that the thickness of the laminated core in the radial direction is increased at a portion where greater stress is generated, while the thickness of the laminated core in the radial direction is decreased at a portion where less stress is generated. In addition, the radius of curvature of the slot is increased at a portion where stress concentration is likely to occur. Based on this idea, the shape of the slot is optimized so as to spread out the stress concentration in the laminated core, and prevent the maximum stress from being locally increased.

Figure 2:
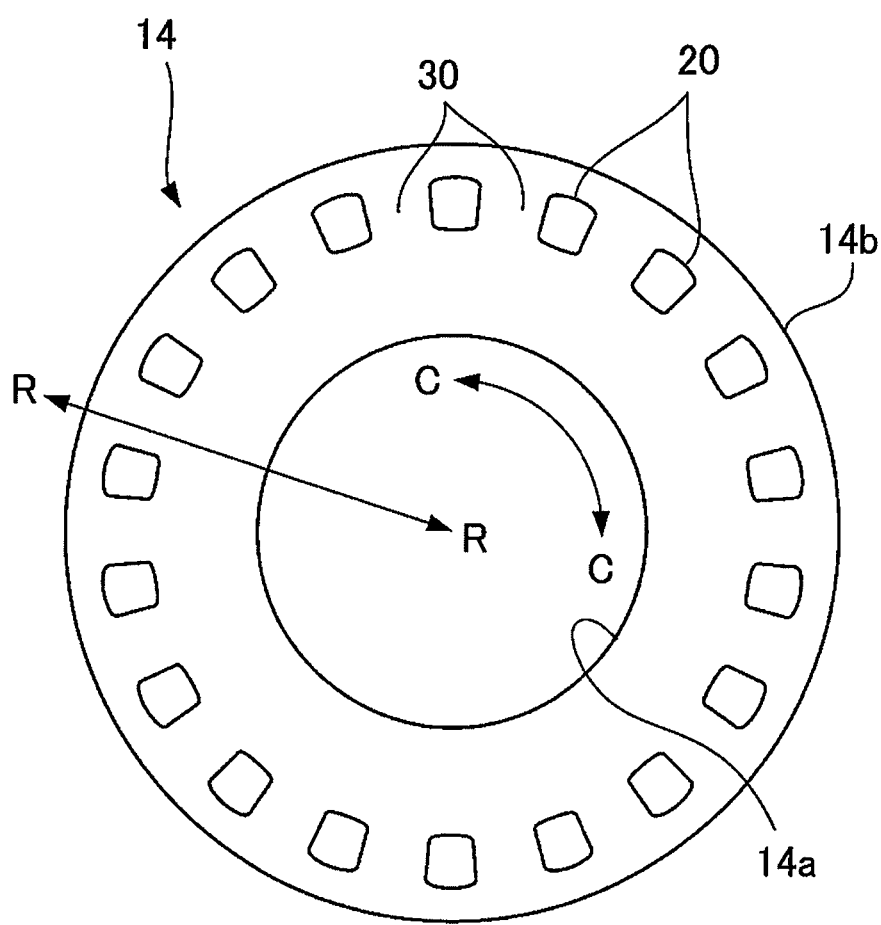
FIG. 2 is a sectional view illustrating a laminated core of the rotor of the embodiment of the present invention.

FIG. 2 is a sectional view illustrating the laminated core 14 of the rotor 10 according to the embodiment of the present invention. FIG. 2 shows a section of the laminated core 14 taken perpendicular to the axial direction O. The laminated core 14 is provided with a plurality of slots 20 spaced apart from each other in the circumferential direction C. A tooth 30 is formed between the adjoining slots 20. Each slot 20 extends along the axial direction O (see FIG. 1), and a conductive bar 16, which is not shown in FIG. 2, is provided so as to extend through the slot 20. In the present embodiment, the slot 20 is a closed slot whose entire circumference is surrounded by the laminated core 14. The respective slots 20 have the same shape as one another. Although not particularly limited, the slot 20 may be designed so as to be elongated in the radial direction R.

Figure 3:
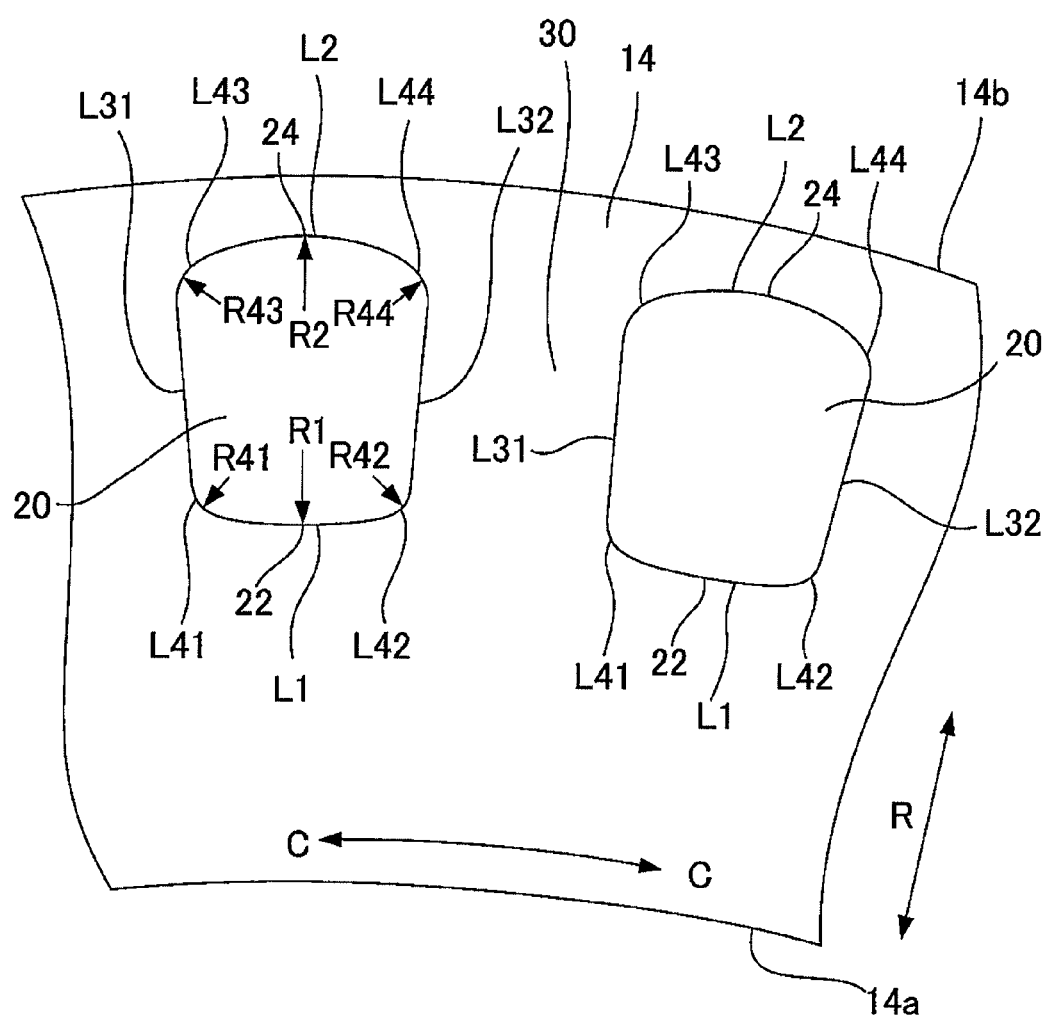
FIG. 3 is a partially enlarged view illustrating a part of the laminated core shown in FIG. 2.

FIG. 3 is a partially enlarged view illustrating two adjoining slots 20 of the laminated core 14 shown in FIG. 2 and their peripheries. In the sectional view, the slot 20 includes an inner circumferential edge L1 extending in the circumferential direction C and positioned on an inner side in the radial direction R, an outer circumferential edge L2 extending in the circumferential direction C and positioned on an outer side in the radial direction R, and a first side portion L31 and a second side portion L32, each of which extends between the inner circumferential edge L1 and the outer circumferential edge L2 along the radial direction R. The slot 20 also includes a first curved corner L41 positioned between the inner circumferential edge L1 and the first side portion L31 to smoothly connect them, a second curved corner L42 positioned between the inner circumferential edge L1 and the second side portion L32 to smoothly connect them, a third curved corner L43 positioned between the outer circumferential edge L2 and the first side portion L31 to smoothly connect them, and a fourth curved corner L44 positioned between the outer circumferential edge L2 and the second side portion L32 to smoothly connect them.

According to the present embodiment, the inner circumferential edge L1, the outer circumferential edge L2 and the curved corners L41 to L44 have a curved shape, respectively, whose radius of curvature is determined in accordance with a certain relation, which will be described in detail below.

A radius of curvature R1 of the inner circumferential edge L1 is sized so as to be larger than a radius of curvature R41 of the first curved corner L41 and a radius of curvature R42 of the second curved corner L42. In this connection, the radius of curvature R41 of the first curved corner L41 may be the same as the radius of curvature R42 of the second curved corner L42.

A radius of curvature R2 of the outer circumferential edge L2 is sized so as to be larger than a radius of curvature R43 of the third curved corner L43 and a radius of curvature R44 of the fourth curved corner L44. In this connection, the radius of curvature R43 of the third curved corner L43 may be the same as the radius of curvature R44 of the fourth curved corner L44. The radius of curvature R2 of the outer circumferential edge L2 is sized so as to be smaller than the radius of curvature R1 of the inner circumferential edge L1.

As can be seen in FIG. 3, the inner circumferential edge L1 and the outer circumferential edge L2 protrude toward the inside and the outside in the radial direction R, respectively. More specifically, the slot 20 has a slot bottom portion 22 positioned innermost in the radial direction R, and a slot top portion 24 positioned outermost in the radial direction R. In the present embodiment, in which the slot 20 has a symmetric shape in the circumferential direction C, the slot bottom portion 22 is positioned in the middle of the inner circumferential edge L1 of the slot 20, and the slot top portion 24 is positioned in the middle of the outer circumferential edge L2 of the slot 20.

According to the present embodiment, the inner thickness of the laminated core 14, which is defined between the slot 20 and the inner circumference 14a of the laminated core 14, has a minimum value at the slot bottom portion 22. In other words, the inner thickness of the laminated core 14 is sized so as to be gradually increased from the slot bottom portion 22 to the first curved corner L41 and the second curved corner L42.

On the other hand, the outer thickness of the laminated core 14, which is defined between the slot 20 and the outer circumference 14b of the laminated core 14, has a minimum value at the slot top portion 24. In other words, the outer thickness of the laminated core 14 is sized so as to be gradually increased from the slot top portion 24 to the third curved core L43 and the fourth curved corner L44.

By virtue of the above-described configuration, the following effects can be achieved.

(1) Since the radii of curvature of the inner circumferential edge L1 and the outer circumferential edge L2 of the slot 20 are larger than that of the curved corners L41 to L44, the inner thickness and the outer thickness of the laminated core 14 are gradually decreased, respectively, toward the slot bottom portion 22 or the slot top portion 24. This reduces stress concentration which occurs at the slot bottom portion 22 and the slot top portion 24.

(2) The inner thickness and the outer thickness of the laminated core 14 is increased, respectively, from the slot bottom portion 22 and the slot top portion 24 toward the respective curved corners L41 to L44. Thus, each of the inner thickness and the outer thickness of the laminated core 14 has a maximum value at the respective curved portions L41 to L44. As a result, even in the case where a greater centrifugal force acts in an area close to the curved portions L41 to L44, the force is received over a wider range of area, thereby resulting in decreased maximum stress.

(3) Since each of the inner thickness and the outer thickness has a minimum value in the middle of the slot 20, stress can be dispersed from the curved corners L41 to L44, where stress concentration tends to occur due to their relatively large curvatures, to the intermediate portion of the slot 20.

As described above, as a result of optimization of the shape of the slot 20, stress generated in the laminated core 14 is spread out so as to reduce stress concentration. Consequently, the maximum stress is decreased, allowing the electric motor having the same level of structural strength as the existing one to be operated at higher rotational speed, or alternatively, allowing a large electric motor, in which increased centrifugal force necessarily acts on the constituent elements thereof, to be operated at the same rotational speed.

According to another aspect of the present embodiment, the radii of curvature of the respective portions are sized so that stress generated on the outer side of the slot 20 has a maximum value at the slot top portion 24. Similarly, the radii of curvature of the respective portions are sized so that stress generated in an area close to the inner circumferential edge L1 has a maximum value at the slot bottom portion 22. According to this configuration, the maximum stress is only generated at two portions, i.e., the slot top portion 24 and the slot bottom portion 22. Therefore, as opposed to the related art disclosed in JP-A-6-253511, damage to the bridge portion, which results in the bridge portion breaking off from the laminated core 14, can be prevented.

According to yet another aspect of the present embodiment, the first side portion L31 and the second side portion L32 of the slot 20 are defined by straight lines. The first side portion L31 of each slot 20 extends parallel to the second side portion L32 of the adjoining slot 20 in the circumferential direction C. Similarly, the second side portion L32 of each slot 20 extends parallel to the first side portion L31 of the adjoining slot 20.

According to this configuration, in which the first side portion L31 and the second side portion L32 are defined by straight lines extending parallel to each other, width of the tooth 30 formed between the adjoining slots becomes constant. Therefore, the amount of magnetic flux passing through the tooth 30 is not limited due to a narrower portion that is locally provided. In addition, since the cross-section area of the slot 20 is substantially maintained, while sufficient tooth width is provided, it is not necessary to reduce the cross-section area of conductor which extends through the slot 20. This results in an enhanced magnetic effect, allowing the amount of torque generated by the electric motor to be increased. Further, since the width of the tooth 30 is constant, stress concentration caused by a narrower portion can be prevented. Furthermore, the tooth 30 without a narrower portion substantially has a large width, thereby reducing the maximum stress. In this connection, the first side portion L31 and the second side portion L32 is not necessarily defined by exact straight lines in cross-section. Rather, the first side portion L31 and the second side portion L32 may be curved or include a curved portion, provided that the magnetic flux path defined by the tooth 30 has substantially constant width.

Figure 4:
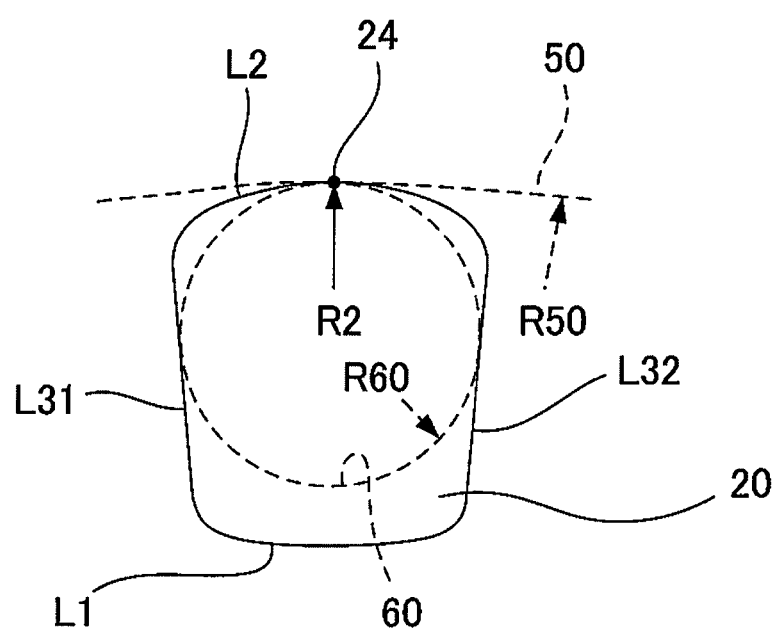
FIG. 4 is a partially enlarged view illustrating a slot of the laminated core shown in FIG. 2.

Referring to FIG. 4, one of the features of the present embodiment according to yet another aspect will be explained. FIG. 4 is a partially enlarged view illustrating one slot 20 of the laminated core 14 shown in FIG. 2. In FIG. 4, an arc 50 of a circle, which is concentric with the laminated core 14 and passes through the slot top portion 24, is depicted by a dashed line. In addition, an inscribed circle 60, which passes through the slot top portion 24 and is inscribed on the first side portion L31 and the second side portion L32, is depicted by a dashed line. In the present embodiment, the radius of curvature R2 of the outer circumferential edge L2 is sized so as to be smaller than the radius R50 of the arc 50, and larger than the radius of curvature R60 of the arc of the inscribed circle 60.

Due to the radius of curvature R2 of the outer circumferential edge L2 sized within the above-described range, the outer thickness of the laminated core 14 is moderately changed in an area close to the slot top portion 24, preventing stress from being concentrated.

Further, due to the radius of curvature R2 of the outer circumferential edge L2 sized within the above-described range, it is ensued that the laminated core has sufficient thickness at the both ends of the outer circumferential edge L2 in the circumferential direction. Accordingly, the maximum stress generated at the both ends of the outer circumferential edge L2 can be reduced.

Figure 5:
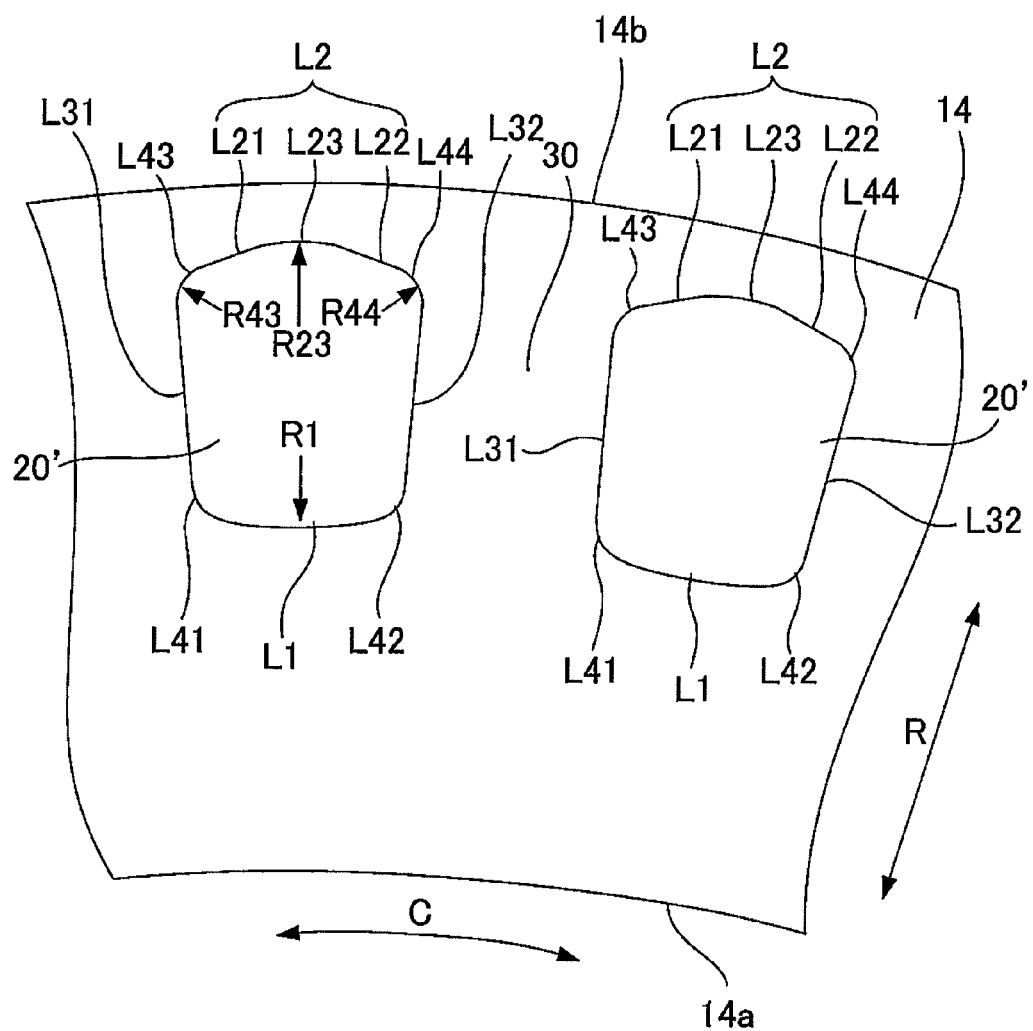
FIG. 5 is a partially enlarged view corresponding to FIG. 3 in a rotor according to another embodiment of the present invention.
Figure 6:
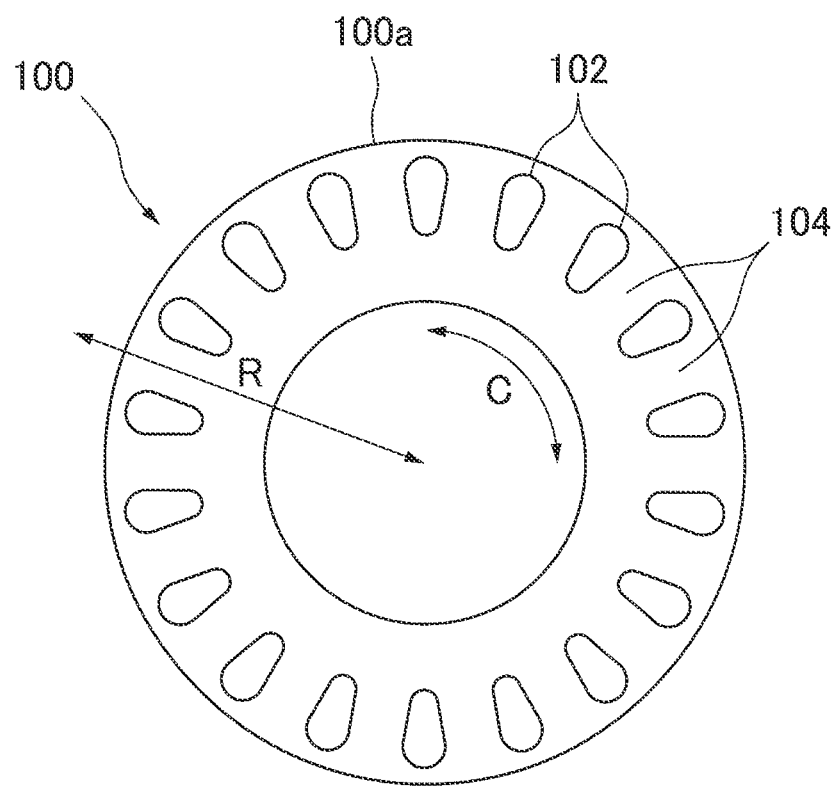
FIG. 6 is a sectional view illustrating a laminated core of a rotor according to one related art.
Figure 7:
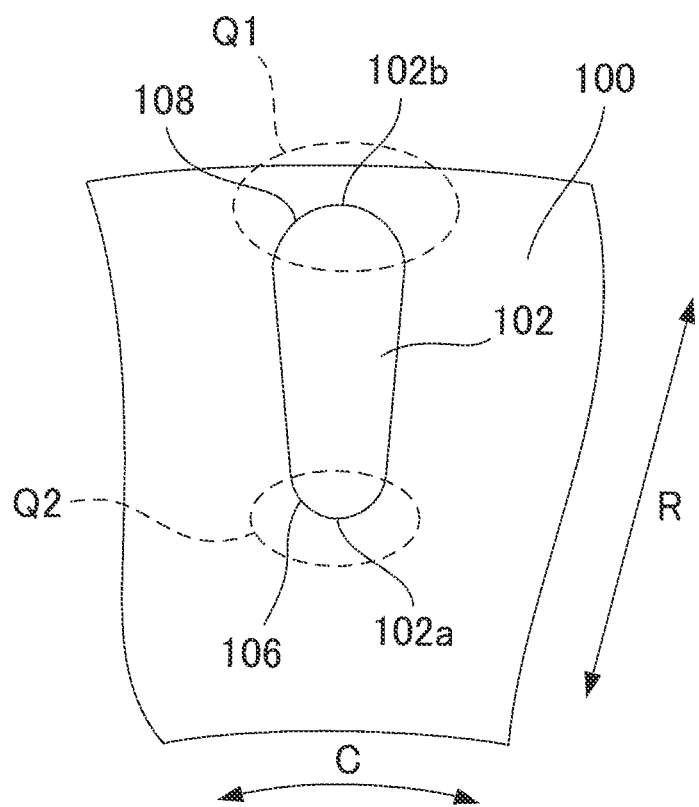
FIG. 7 is a partially enlarged view illustrating a part of the laminated core of FIG. 6.
Figure 8:
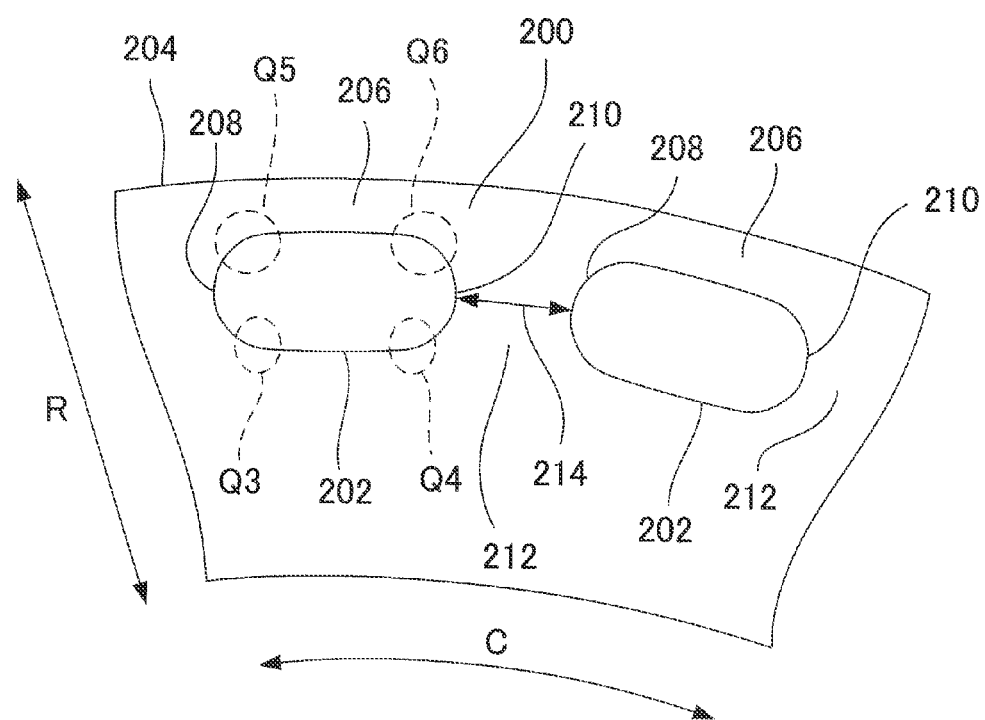
FIG. 8 is a partially enlarged view illustrating a part of the laminated core according to another related art.

FIG. 5 is a partially enlarged view corresponding to FIG. 3 in a rotor according to another embodiment of the present invention. In this embodiment, the outer circumferential edge L2 includes a first straight line portion L21 extending from the third curved corner L43 to the top portion of the slot 20', a second straight line portion L22 extending from the fourth curved corner L44 to the top portion of the slot 20', and a curved portion L23 connecting the first straight line portion L21 to the second straight line portion L22.

Similarly as the embodiment described above with reference to FIG. 3, a radius of curvature R23 of the curved portion L23 is sized so as to be larger than the radius of curvature R43 of the third curved corner L43 and the radius of curvature R44 of the fourth curved corner L44.

Due to the outer circumferential edge L2, a part of which is defined by a straight line as described above, the laminated core 14 has wider portions at the third curved corner L43 and the fourth curved corner L44. Accordingly, even in the case where a greater tensile force acts on a bridge portion extending between the outer circumference 14b of the laminated core 14 and the slot 20', the maximum stress generated in the laminated core 14 can be reduced, thereby preventing the laminated core 14 from being damaged. Preferably, the radius of curvature R23 of the curved portion L23 is sized so as to be smaller than the radius of curvature R1 of the inner circumferential edge L1.

As described above, according to the rotor of the embodiments, stress generated in the laminated core is spread out, and thus stress concentration is reduced, resulting in decreased maximum stress. Therefore, the electric motor can be operated at higher rotational speed, thereby increasing the power output. Alternatively, the present invention may also be preferably applied to an electric motor whose size in the radial direction is large. Specifically, since the size of the rotor, such as the inner diameter, is larger, the centrifugal force acting on the laminated core is increased. Therefore, even in the case where the same rotational speed is required, a large-sized rotor poses a risk of causing problems. However, according to the rotor of the embodiments, the maximum stress generated in the laminated core is decreased, thereby allowing a large-sized rotor to be advantageously implemented.

In the rotor described above, copper and copper alloy whose density is relatively high, resulting in an increased centrifugal force generated, may be preferably used as a material of the laminated core. Since copper or copper alloy have lower electrical resistance, an electric motor which includes a laminated core made thereof can be improved in its electric characteristics.

Effect of the Invention

According to the configuration of the present invention, the radii of the inner circumferential edge and the outer circumferential edge of the slot, in which stress tends to be concentrated, are sized so as to be relatively larger. In addition, the curved corners of the slot, in which greater stress is generated, are sized so that the laminated core has greater thickness in the radial direction. Therefore, the stress generated in the laminated core when the rotor is rotated is spread out, reducing the maximum stress. As a result, a rotor which can be operated at higher rotational speed is provided, and an electric motor including such a rotor can produce higher power output.

Various embodiments and variations of the present invention have been explained above. However, it will be apparent to persons skilled in the art that the function and effect intended by the present invention can also be realized by other embodiments and variations. In particular, the constituent elements of the embodiments and variations described above may be deleted or substituted, or a known means may be additionally provided without departing from the scope and spirit of the present invention. Further, it will be apparent to persons skilled in the art that the present invention may be implemented by any combination of features of a plurality of embodiments disclosed herein, either explicitly or implicitly.

What is claimed is:

1. A squirrel-cage rotor comprising:
a rotational axis extending in an axial direction;
a laminated core provided on an outer circumference of the rotational axis; and
a plurality of slots arranged in the laminated core so as to be spaced apart from each other in a circumferential direction, and extending in the axial direction,
wherein each slot is a closed slot whose entire circumference is closed by the laminated core, and has a sectional shape in a direction perpendicular to the axial direction,
wherein the sectional shape of each slot includes:
an inner circumferential edge and an outer circumferential edge, each of which extends in the circumferential direction of the laminated core;
a first side portion and a second side portion, each of which extends in a radial direction of the laminated core;
a first curved corner connecting the inner circumferential edge to the first side portion;
a second curved corner connecting the inner circumferential edge to the second side portion;
a third curved corner connecting the outer circumferential edge to the first side portion; and
a fourth curved corner connecting the outer circumferential edge to the second side portion,
wherein the inner circumferential edge has a radius of curvature greater than that of the first curved corner and the second curved corner, the inner circumferential edge protruding inwardly in the radial direction, and
wherein the outer circumferential edge has a radius of curvature greater than that of the third curved corner and the fourth curved corner, the outer circumferential edge protruding outwardly in the radial direction.

2. The squirrel-cage rotor according to claim 1, wherein the first side portion and the second side portion are respectively defined by straight lines, and the first side portion and the second side portion are formed so as to respectively extend parallel to the second side portion and the first side portion of other slots adjoining thereto in the circumferential direction.

3. The squirrel-cage rotor according to claim 1, wherein the laminated core has an inner thickness defined between the inner circumferential edge and an inner circumference of the laminated core, the inner thickness being sized from one of the first curved corner and the second curved corner toward the other of the first curved corner and the second curved corner, such that the inner thickness is gradually decreased until it reaches a minimum value at a slot bottom portion, and is gradually increased after reaching the minimum value.

4. The squirrel-cage rotor according to claim 3, wherein the slot bottom portion is positioned in the middle of the slot in the circumferential direction.

5. The squirrel-cage rotor according to claim 1, wherein the laminated core has an outer thickness defined between the outer circumferential edge and an outer circumference of the laminated core, the outer thickness being sized from one of the third curved corner and the fourth curved corner to the other of the third curved corner and the fourth curved corner, such that the outer thickness is gradually decreased until it reaches a minimum value at a slot top portion, and is gradually increased after reaching the minimum value.

6. The squirrel-cage rotor according to claim 5, wherein the slot op portion is positioned in the middle of the slot in the circumferential direction.

7. The squirrel-cage rotor according to claim 5, wherein the outer circumferential edge has a curved portion passing through the slot top portion, the curved portion having a radius of curvature sized to be smaller than a radius of a circle which is concentric with the laminated core and passes through the slot top portion, and larger than a radius of an inscribed circle which passes through the slot top portion and is inscribed in the first side portion and the second side portion.

8. An electric motor having the squirrel-cage rotor according to claim 1.

* * * * *